(12) United States Patent
Kim et al.

(10) Patent No.: US 11,423,166 B2
(45) Date of Patent: Aug. 23, 2022

(54) METHOD AND APPARATUS FOR INSPECTING SENSITIVE INFORMATION STORED IN FILE SYSTEM

(71) Applicant: SOMANSA CO., LTD., Seoul (KR)

(72) Inventors: Tae Wan Kim, Seoul (KR); Il Hoon Choi, Seoul (KR)

(73) Assignee: SOMANSA CO., LTD., Seoul (KR)

( * ) Notice: Subject to any disclaimer, the term of this patent is extended or adjusted under 35 U.S.C. 154(b) by 691 days.

(21) Appl. No.: 16/421,706

(22) Filed: May 24, 2019

(65) Prior Publication Data

US 2020/0342134 A1 Oct. 29, 2020

(30) Foreign Application Priority Data

Apr. 25, 2019 (KR) ........................ 10-2019-0048452

(51) Int. Cl.
*G06F 21/62* (2013.01)
*G06F 16/16* (2019.01)
*G06F 16/17* (2019.01)

(52) U.S. Cl.
CPC ........ *G06F 21/6218* (2013.01); *G06F 16/162* (2019.01); *G06F 16/1734* (2019.01)

(58) Field of Classification Search
CPC ............ G06F 21/6218; G06F 21/6245; G06F 21/552; G06F 21/565; G06F 16/162;
(Continued)

(56) References Cited

U.S. PATENT DOCUMENTS 8,332,907 B2 * 12/2012 Canning ............. G06F 21/6218
709/224

2004/0210608 A1 * 10/2004 Lee ..................... G06F 11/1448
(Continued)

FOREIGN PATENT DOCUMENTS

JP 1999-327945 A 11/1999
JP 11327945 A * 11/1999
(Continued)

OTHER PUBLICATIONS

Luis Rocha, "Digital Forensics—NTFS Change Journal", https://countuponsecurity.com/2017/05/25/digital-forensics-ntfs-change-journal/, May 25, 2017, 5 pages (Year: 2017).*
(Continued)

*Primary Examiner* — Carl G Colin
*Assistant Examiner* — Han Yang
(74) *Attorney, Agent, or Firm* — Harness, Dickey & Pierce, P.L.C.

(57) ABSTRACT

Disclosed is a method of inspecting sensitive information stored in a file system. The method includes storing file inspection result information including a file path field, a field of whether file writing is changed, a file size field, a final file modification date field, and a field of a number of detection per pattern, with respect to files in the file system, monitoring a file change event generated in the file system, detecting a type of the file change event sensed according to the monitoring the file change event, modifying the file inspection result information with respect to the file system according to the type of the file change event, detecting whether sensitive information is included, with respect to modified files in the file inspection result information, and modifying the file inspection result information by reflecting sensitive detection information according to the detection of the sensitive information.

11 Claims, 2 Drawing Sheets

(58) Field of Classification Search
CPC .... G06F 16/1734; G06F 16/122; G06F 16/17; G06F 11/30
See application file for complete search history.

(56) References Cited

U.S. PATENT DOCUMENTS

| | | | | |
|---|---|---|---|---|
| 2008/0077988 | A1* | 3/2008 | Small | G06F 11/3476 726/22 |
| 2015/0347447 | A1* | 12/2015 | Ho | G06F 16/178 707/622 |

FOREIGN PATENT DOCUMENTS

| | | | |
|---|---|---|---|
| JP | 2000-163300 A | | 6/2000 |
| JP | 2007-004645 A | | 1/2007 |
| JP | 2007004645 A | * | 1/2007 |
| KR | 10-2018-0113295 A | | 10/2018 |

OTHER PUBLICATIONS

Adam Bertram, "How To Monitor a Windows Folder for New Files", https://mcpmag.com/articles/2019/05/01/monitor-windows-folder-for-new-files.aspx, May 1, 2019, 3 pages (Year: 2019).*
"EaseFilter File System Filter Driver SDK Solutions", http://filterdriver.com/Solutions.htm, Apr. 14, 2019, 2 pages (Year: 2019).*
"Event Tracing for Windows (ETW)", https://docs.microsoft.com/en-us/windows-hardware/drivers/devtest/event-tracing-for-windows--etw-, Jan. 15, 2019, 1 page (Year: 2019).*
Office Action from corresponding Korean Patent Application No. 10-2019-0048452, dated Jun. 10, 2020.

* cited by examiner

METHOD AND APPARATUS FOR INSPECTING SENSITIVE INFORMATION STORED IN FILE SYSTEM

CROSS-REFERENCE TO RELATED APPLICATION

This application claims priority to and the benefit of Korean Patent Application No. 10-2019-0048452, filed on Apr. 25, 2019, the disclosure of which is incorporated herein by reference in its entirety.

FIELD

The present invention relates to a technique with respect to monitoring of a file system, and more particularly, to a technique of efficiently inspecting a file, in which sensitive information including personal information, confidential information, and the like are stored, to protect personal information and to prevent an information leak.

BACKGROUND

To protect personal information and to prevent a data leak, it is necessary to check a present condition of retaining personal information and classified information by periodically inspecting how many patterns of personal information and classified information are included in files stored in a certain desktop computer, a laptop computer, a server, and the like.

As a method of periodically inspecting personal information and classified information stored in files, there is a method of generating a new total file inspection result each time by inspecting files while circulating all directories and files of a file system. Also, a method of generating an improved type initial total file inspection result and checking the total file inspection result while circulating all directories and files of a file system to change a final file modification date, a file size, a file hash value, or the like, or a method of modifying a file inspection result by inspecting only a newly generated file is used. However, in these methods, since it is necessary to circulate all directories and files of a file system, when a large number of directories and files are present, a large amount of time is consumed and a great load occurs although most files are not changed. Also, information on inspection with respect to a large number of files which do not include personal information and classified information is unnecessarily stored.

Also, a method of inspecting files by detecting that a file is stored in real time is used. However, when files are repetitively stored, an unnecessarily great load occurs due to the repetitive file inspection.

RELATED ART DOCUMENT

Korean Patent Publication No. 10-2018-0113295 (Oct. 16, 2018)

SUMMARY

The present invention is directed to providing a method and an apparatus for inspecting sensitive information stored in a file system, in which a history of files changed through monitoring of the file system is separately stored and then whether sensitive information is included is inspected with respect to only changed files instead of all files to efficiently manage the sensitive information.

One aspect of the present invention provides a method of inspecting sensitive information stored in a file system. The method includes storing file inspection result information including a file path field, a field of whether file writing is changed, a file size field, a final file modification date field, and a field of a number of detection per pattern, with respect to files in the file system, monitoring a file change event generated in the file system, detecting a type of the file change event sensed according to the monitoring the file change event, modifying the file inspection result information with respect to the file system according to the type of the file change event, detecting whether sensitive information is included, with respect to modified files in the file inspection result information, and modifying the file inspection result information by reflecting sensitive detection information according to the detection of the sensitive information.

The file path field may be a key field, which identifies a file of the file system, and may refer to a file path of the sensitive information. Here, the field of whether file writing is changed may refer to whether a file content change, a file size change, or change of a final file modification date occurs. Also, the field for a number of detection per pattern may refer to a matched number detected per pattern of the sensitive information from the file of the file system.

The monitoring of the file change event may include monitoring the file change event using a file system change notification application program interface (API), a file system change journal, a kernel event, and a kernel file system driver.

The type of the file change event may be any one of a file writing event, a file deletion event, a file movement event, and a directory movement event.

The modifying of the file inspection result information may include modifying, when the file writing event occurs, to add a file path of the file writing event to the file path field, and modifying the field of whether file writing is changed, to be True, modifying, when the file deletion event occurs, to delete a file path corresponding to the file deletion event from the file path field, modifying, when the file movement event occurs, a current file path of the file path field to be a new file path of the file movement event, and modifying, when the directory movement event occurs, a current directory path of the file path field to be a new directory path of the directory movement.

The detecting of whether the sensitive information is included may include generating a number of detection per pattern related to the sensitive information by extracting of file content, a regular expression and matching of a key word with respect to the file in which the field of whether file writing is changed is True from the file inspection result information.

The modifying of the file inspection result information by reflecting the sensitive detection information may include modifying, when the number of detection per pattern is generated, the file path field to be the generated number of detection per pattern in the file inspection result information, and modifying the field of whether file writing is changed, to be False.

The method may further include, after the modifying of the file inspection result information, transmitting the sensitive detection information reflected in the file inspection result information to a management server.

Another aspect of the present invention provides an apparatus for inspecting sensitive information stored in a file system. The apparatus includes a database which stores file inspection result information including a file path field, a field of whether file writing is changed, a file size field, a final file modification date field, and a field of a number of detection per pattern, with respect to files in the file system, an event monitoring portion which monitors a file change event generated in the file system, an information modification controller which detects a type of the file change event sensed according to the monitoring the file change event and modifies the file inspection result information with respect to the file system according to the type of the file change event, and a sensitive information detector which detects whether sensitive information is included, with respect to modified files in the file inspection result information. Here, the information modification controller modifies the file inspection result information by reflecting sensitive detection information according to the detecting of the sensitive information.

The event monitoring portion may monitor the file change event using a file system change notification API, a file system change journal, a kernel event, and a kernel file system driver.

The event monitoring portion may monitor any one of a file writing event, a file deletion event, a file movement event, and a directory movement event, as the type of the file change event.

The information modification controller may perform operations of modifying, when the file writing event occurs, to add a file path of the file writing event to the file path field, and modifying the field of whether file writing is changed, to be True, modifying, when the file deletion event occurs, to delete a file path corresponding to the file deletion event from the file path field, modifying, when the file movement event occurs, a current file path of the file path field to be a new file path of the file movement event, and modifying, when the directory movement event occurs, a current directory path of the file path field to be a new directory path of the directory movement.

The sensitive information detector may generate a number of detection per pattern related to the sensitive information by extracting of file content, a regular expression and matching of a key word with respect to the file in which the field of whether file writing is changed is True from the file inspection result information.

The information modification controller modifies, when the number of detection per pattern is generated, the file path field to be the generated number of detection per pattern in the file inspection result information, and modifies the field of whether file writing is changed, to be False.

The apparatus may further include an information transmitter which transmits the sensitive detection information reflected in the file inspection result information to a management server.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Hereinafter, exemplary embodiments of the present invention will be described in detail with reference to the attached drawings.

The embodiments of the present invention are provided to more completely explain the present invention to one of ordinary skill in the art. The following embodiments may be modified into a variety of different forms, and the scope of the present invention is not limited thereto. The embodiments are provided to make the disclosure more substantial and complete and to completely convey the concept of the present invention to those skilled in the art.

The terms used herein are to explain particular embodiments and are not intended to limit the present invention. As used herein, singular forms, unless contextually defined otherwise, may include plural forms. Also, as used herein, the term "and/or" includes any and all combinations or one of a plurality of associated listed items.

Figure 1:
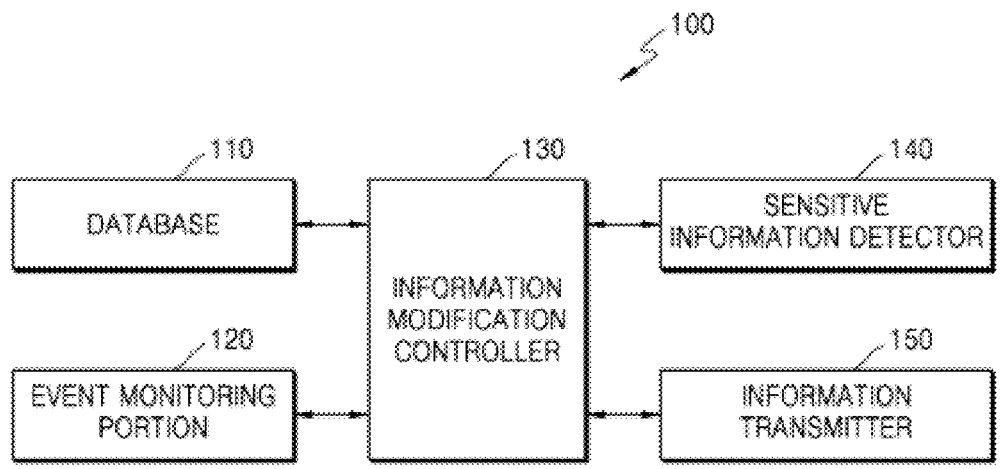
FIG. 1 is a configuration diagram illustrating an apparatus for inspecting sensitive information stored in a file system according to one embodiment of the present invention.

FIG. 1 is a configuration diagram illustrating an apparatus 100 for inspecting sensitive information stored in a file system according to one embodiment of the present invention.

Referring to FIG. 1, the apparatus 100 includes a database 110, an event monitoring portion 120, an information modification controller 130, a sensitive information detector 140, and an information transmitter 150.

The database 110 stores file inspection result information including a file path field, a field of whether file writing is changed, a file size field, a final file modification date field, and a field for a number of detection per pattern. Here, the file system means a system which manages an auxiliary memory device and files stored therein in an operating system (OS). The file system stores a file in a directory, gives a newly generated file a name, and sets a path to a file through a directory structure. Also, the file system may mean an OS or an additional program, which supports organization of files systematically.

The database 110 may use a storage such as SQLite or a key-value storage such as levelDB for storing the file inspection result information including the fields of a file path, whether file writing is changed, a file size, a final file modification date, and a number of detection per pattern, and the like.

The file path field is a key field, which identifies a file of the file system, and is a path of a file, in which personal information and classified information are detected, or a path of a file which is changed by overwriting, subsequent writing, cutting-off, and the like and is an object from which personal and classified information are detected. The field of whether file writing is changed shows whether a file content and size change such as file overwriting, subsequent writing, cutting-off, and the like or a final file modification date change occurs in a corresponding file. Also, the field of a number of detection per pattern includes a matched number which is detected per pattern of personal information and classified information from the corresponding file. The database 110 may additionally store fields of a file hash value, a file generation date, a final file-access date, and a file format as necessary.

The event monitoring portion 120 monitors a file change event which occurs in the file system.

The event monitoring portion 120 may monitor the file change event using a file system change notification application program interface (API), a file system change journal, a kernel event, and a kernel file system driver. For example, the event monitoring portion 120 may monitor the file change event using ReadDirectoryChangesW of FindFirstChangeNotification of Windows as the file system change notification API. Also, the event monitoring portion 120 may monitor the file change event using NTFS Change Journals as the file system change journal. Also, the event monitoring portion 120 may monitor the file change event using Event Tracing for Windows of Windows as the kernel event. Also, the event monitoring portion 120 may monitor the file change event using a file system mini-filter of Windows as the kernel file system driver.

Here, the event monitoring portion 120 may monitor any one of a file writing event, a file deletion event, a file movement event, and a directory movement event, as a type of the file change event.

The event monitoring portion 120 monitors the file content and size change such as file overwriting, subsequent writing, cutting-off, and the like or the final file modification date change, as the file writing event. Also, the event monitoring portion 120 monitors a complete file deletion as the file deletion event. Also, the event monitoring portion 120 monitors file path movement and file name change. Also, the event monitoring portion 120 monitors directory path movement and name change.

The information modification controller 130 detects a type of the file change event detected by monitoring with respect to the file change event of the event monitoring portion 120 and controls modification of the file inspection result information with respect to the file system according to the type of the detected file change event.

When the file writing event is detected among types of the file change event, the information modification controller 130 controls the file path field to be modified to a file path of the file writing event and controls a value of the field of whether file writing is changed in the database 110 to be modified to True. Accordingly, the file path field of the database 110 is changed to the file path of the file writing event and the field of whether file writing is changed is changed to a true value.

Also, when the file deletion event is detected among types of the file change event, the information modification controller 130 controls such that a file path corresponding to the file deletion event is deleted from the file path field of the database 110. Accordingly, the file path is deleted from the file path field of the database 110.

Also, when the file movement event is detected among types of the file change event, the information modification controller 130 controls such that a current file path of the file path field of the database 110 is a new file path of the file movement event. Accordingly, the file path field of the database 110 is changed to the new file path of the file movement event.

Also, when the directory movement event is detected among types of the file change event, the information modification controller 130 controls such that a current directory path of the file path field of the database 110 is a new directory path of the directory movement event. Accordingly, the file path field of the database 110 is changed to the new directory path of the directory movement event.

The sensitive information detector 140 detects, whether sensitive information is included, with respect to modified files from the file inspection result information stored in the database 110. The sensitive information detector 140 periodically (for example, once a day at a particular time) searches for the file inspection result information of the database 110. Here, all pieces of information are not detected from the file inspection result information, and the information modification controller 130 detects whether sensitive information is included in information modified by the file change event. For example, the sensitive information detector 140 detects sensitive information with respect to a file of a file path of file inspection result information in which the field of whether file writing is changed is True. Here, the sensitive information includes personal information, classified information, and the like. The sensitive information detector 140 detects the sensitive information by extracting of file content, a regular expression and matching of a key word with respect to the file in which the field of whether file writing is changed is True from the file inspection result information. Here, the number of detection per pattern related to the sensitive information may be generated. Here, the number of detection per pattern may be generated as a number of detected pieces of personal information or classified information classified for each pattern from the sensitive information. List information related to the sensitive information detected by the sensitive information detector 140 from the file inspection result information may be referred to as sensitive detection information.

After the sensitive detection information is generated, the information modification controller 130 modifies the file inspection result information by reflecting the sensitive detection information according to detection of the sensitive information of the sensitive information detector 140.

When the number of detection per pattern of the sensitive information is generated, the information modification controller 130 modifies information of the number of detection per pattern generated with respect to the file path field in the file inspection result information of the database 110 and modifies the field of whether file writing is changed, as False. Also, the information modification controller 130 modifies fields of the file size or the final file medication date of the database 110. Meanwhile, when the number of detection per pattern is not generated, the information modification controller 130 deletes file information which is a file path, in which the file path field is detected, from the file inspection result information.

The information transmitter 150 transmits the sensitive detection information reflected in the file inspection result information of the database 110 to a management server. When patterns of the personal information, the classified information, and the like are detected with respect to all changed files and completely reflected in the file inspection result, the information transmitter 150 may transmit or output sensitive detection information corresponding to a present condition of retaining final personal information and classified information under the control of the information modification controller 130. To this end, the information transmitter 150 is connected to a management server through wires or a wireless communication network.

Meanwhile, the information modification controller 130 controls such that initial file inspection result information is generated by detecting sensitive information while all directories and files of the file system once first, controls an operation of the event monitoring portion 120 to monitor the file system in real time, and controls such that a pattern of the sensitive information is periodically detected with respect to a changed file of the file inspection result information and reflected in the file detection result information.

Figure 2:
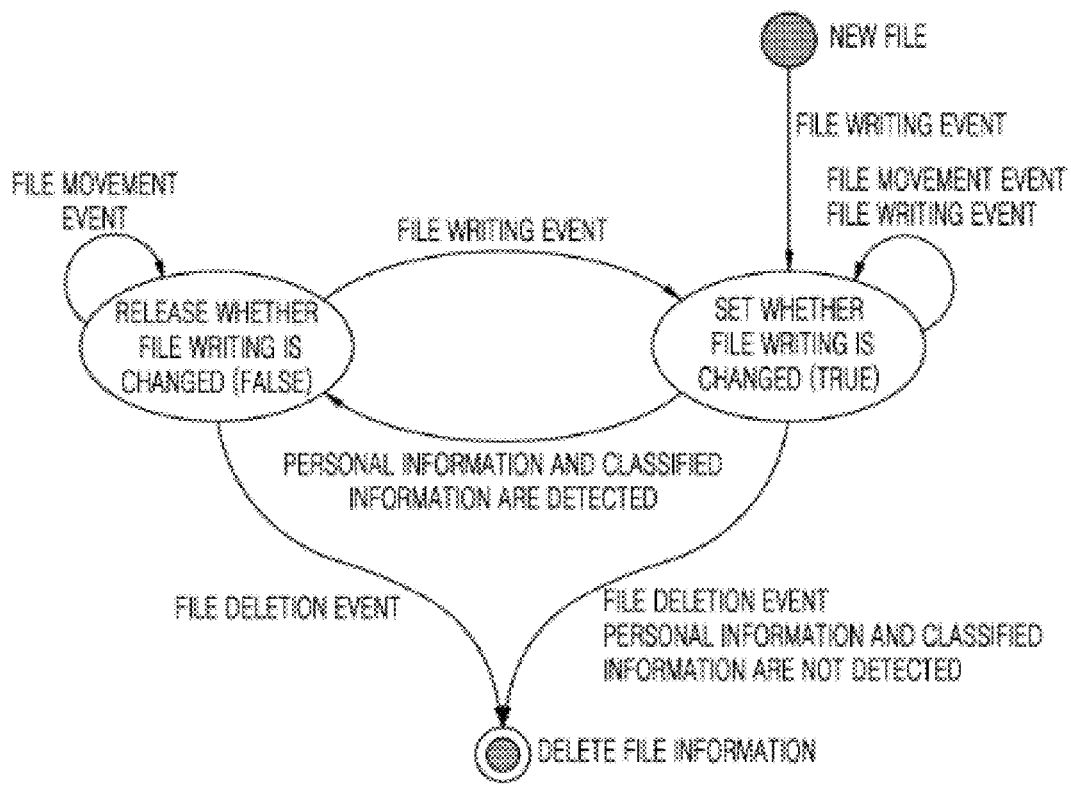
FIG. 2 is a reference view illustrating an operation state of the apparatus for inspecting sensitive information stored in the file system according to one embodiment of the present invention.

FIG. 2 is a reference view illustrating an operation state of the apparatus for inspecting sensitive information stored in the file system according to one embodiment of the present invention.

Referring to FIG. 2, the apparatus 100 monitors the file system in real time and collects file change events such as a file writing event, a file deletion event, a file movement event, a directory movement event, and the like. Afterwards, whenever a file change event is collected, the apparatus 100 reflects the file change event in the file inspection result information according to a type thereof. Here, the field of whether file writing is changed is changed to true. Afterwards, the apparatus 100 periodically detects a pattern of sensitive information such as personal information and classified information with respect to a changed file and generates final file inspection result information by reflecting a detection result in the file inspection result information. Accordingly, the field of whether file writing is changed is changed to false to determine a next file change event.

Figure 3:
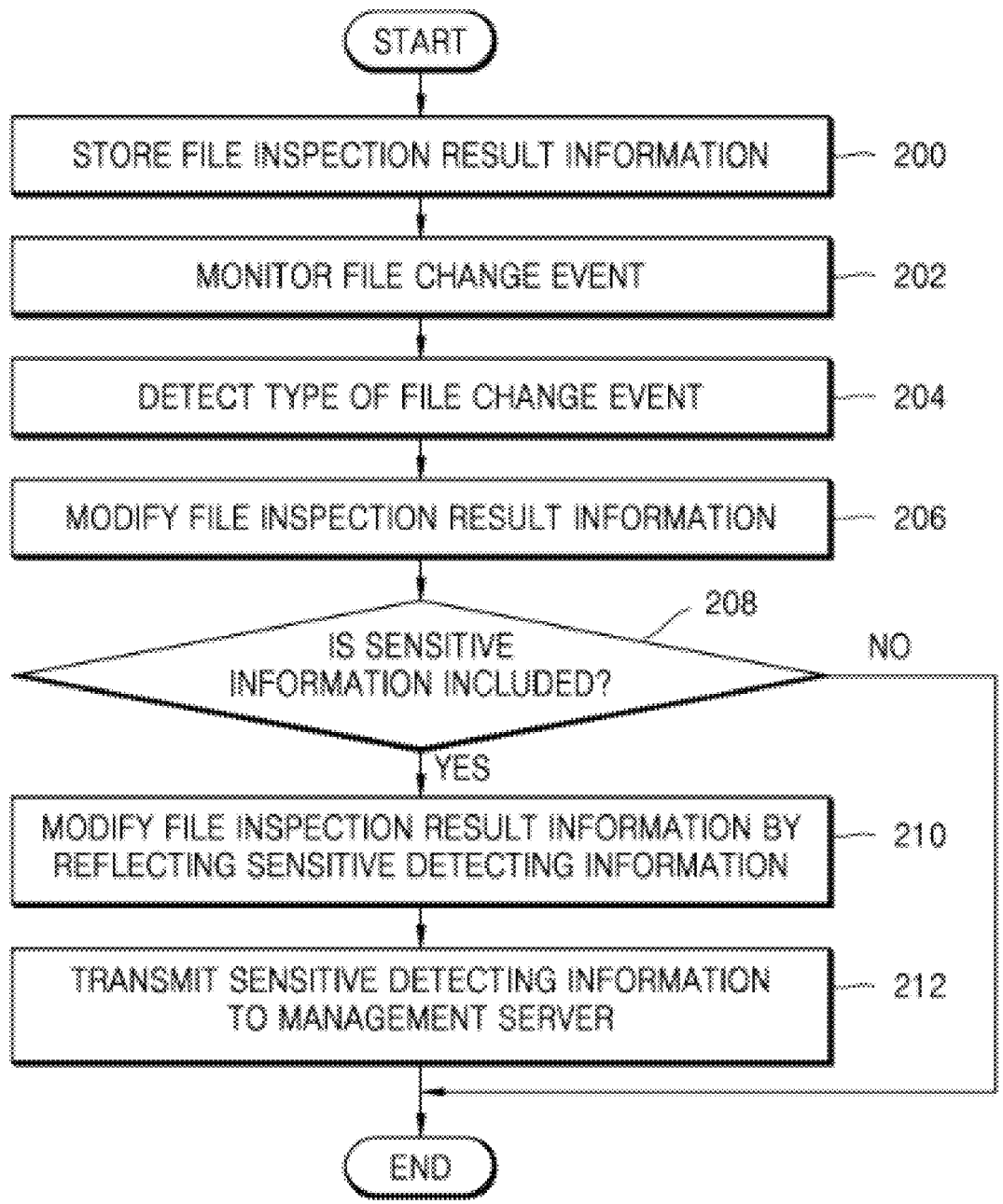
FIG. 3 is a flowchart illustrating a method for inspecting sensitive information stored in a file system according to one embodiment of the present invention.

FIG. 3 is a flowchart illustrating a method for inspecting sensitive information stored in a file system according to one embodiment of the present invention.

An apparatus for inspecting sensitive information stores file inspection result information including a file path field, a field of whether file writing is changed, a file size field, a final file modification date field, and a field for a number of detection per pattern (200). The apparatus may use a storage such as SQLite or a key-value storage such as levelDB for storing the file inspection result information including fields of a file path, whether file writing is changed, a file size, a final file modification date, and a number of detection per pattern, and the like.

The file path field is a key field, which identifies a file of the file system, and is a path of a file, in which personal information and classified information are detected, or a path of a file which is changed by overwriting, subsequent writing, cutting-off, and the like and is an object from which personal and classified information are detected. The field of whether file writing is changed shows whether file content and size changes such as file overwriting, subsequent writing, cutting-off, and the like or a final file modification date change occurs in a corresponding file. Also, the field of a number of detection per pattern includes a matched number which is detected per pattern of personal information and classified information from the corresponding file. The database 110 may additionally store fields of a file hash value, a file generation date, a final file-access date, and a file format as necessary.

After the operation 200, the apparatus monitors a file change event generated in the file system (202).

The apparatus may monitor the file change event using a file system change notification API, a file system change journal, a kernel event, and a kernel file system driver. For example, the apparatus may monitor the file change event using ReadDirectoryChangesW of FindFirstChangeNotification of Windows as the file system change notification API. Also, the apparatus may monitor the file change event using NTFS Change Journals as the file system change journal. Also, the apparatus may monitor the file change event using Event Tracing for Windows of Windows as the kernel event. Also, the apparatus may monitor the file change event using a file system mini-filter of Windows as the kernel file system driver.

After the operation 202, the apparatus detects a type of the file change event sensed by monitoring the file change event (204).

Here, the apparatus may monitor any one of a file writing event, a file deletion event, a file movement event, and a directory movement event, as a type of the file change event. The apparatus detects the file content and size change such as file overwriting, subsequent writing, cutting-off, and the like or the final file modification date change, as the file writing event. Also, the apparatus detects a complete file deletion as the file deletion event. Also, the apparatus detects a file path movement and a file name change as the file movement event. Also, the apparatus detects a directory path movement and a directory name change as the directory movement event.

After the operation 204, the apparatus modifies the file inspection result information with respect to the file system according to a type of the file change event (206).

When the file writing event is detected among types of the file change event, the apparatus modifies a file path of the file writing event in the file path field of the database and modifies a value of the field of whether file writing is changed, in the database as True. Accordingly, the file path field of the database is changed to the file path of the file writing event and the field of whether file writing is changed is changed to a true value.

Also, when the file deletion event is detected among types of the file change event, the apparatus deletes a file path corresponding to the file deletion event from the file path field of the database. Accordingly, the file path is deleted from the file path field of the database.

Also, when the file movement event is detected among types of the file change event, the apparatus modifies a current file path of the file path field to a new file path of the file movement event. Accordingly, the file path field of the database is changed to the new file path of the file movement event.

Also, when the directory movement event is detected among types of the file change event, the apparatus modifies a current directory path of the file path field to a new directory path of the directory movement event. Accordingly, the file path field of the database is changed to the new directory path of the directory movement event.

After the operation 206, the apparatus detects whether sensitive information is included, with respect to the modified files in the file inspection result information (208).

The apparatus detects whether sensitive information is included, with respect to modified files in file inspection result information stored in the database. The apparatus periodically searches for the file inspection result information of the database. Here, all pieces of information in the file inspection result information are not searched for, and whether the sensitive information is included in the information modified by the file change event is detected. For example, the apparatus detects sensitive information with respect to a file of a file path in which the field of whether file writing is changed is True. Here, the sensitive information includes personal information, classified information, and the like. The apparatus detects the sensitive information by extracting file content with respect to the file in which the field of whether file writing is changed is True from the file inspection result information and matching a regular expression with a key word. Here, the number of detection per pattern related to the sensitive information may be generated. Here, the number of detection per pattern may be generated as a number of detected pieces of personal information or classified information classified for each pattern from the sensitive information.

After 208, the apparatus modifies the file inspection result information by reflecting sensitive detection information according to detection of the sensitive information (210). When the number of detection per pattern of the sensitive information is generated, the apparatus modifies information of the number of detection per pattern generated with respect to the file path field among the file inspection result information of the database and modifies the field of whether file writing is changed, as False. Also, the apparatus modifies fields of a file size, a final file modification date, and the like in the database. Meanwhile, when the number of detection per pattern is not generated, the apparatus deletes file information which is a file path, in which the file path field is detected, from the file inspection result information.

After the operation 210, the apparatus modifies the file inspection result information and then transmits the sensitive detection information reflected in the file inspection result information to a management server (212). The apparatus detects patterns of personal information, classified information, and the like with respect to all changed files, and when reflection in a file inspection result is finished, transmits or outputs sensitive detection information corresponding to a present condition of retaining final personal information and classified information, to the management server.

The apparatus generates final file inspection result information by detecting sensitive information while circulating all directories and files of a file system once first, monitors the file system in real time, periodically detects a pattern of the sensitive information with respect to only a changed file of the file inspection result information, and reflects the detected pattern in the file inspection result information.

According to the embodiments of the present invention, since file inspection result information is stored to periodically inspect sensitive information including personal information and classified information and only a changed file is detected and managed using the stored file inspection result information such that it is unnecessary to inspect all directories and files in a file system, a large amount of time may be prevented from being consumed for file inspection and a load caused by the file inspection may be prevented.

The exemplary embodiments of the present invention have been described above. It will be understood by one of ordinary skill in the art that modifications may be made without departing from the scope of the essential features of the present invention. Therefore, the described embodiments should be considered in a descriptive point of view not in a limitative one. Accordingly, the scope of the present invention is not limited to the above-described embodiments and should be interpreted as including the content stated in the claims and a variety of embodiments within the equivalent scope thereof.

What is claimed is:

1. A method of inspecting sensitive information stored in a file system, the method comprising:
   storing file inspection result information including a file path field, a field of whether file writing is changed, a file size field, a final file modification date field, and a field of a number of detections per pattern, with respect to a file in the file system;
   monitoring a file change event generated in the file system;
   detecting a type of the file change event sensed according to the file change event;
   modifying the file inspection result information with respect to the file system according to the type of the file change event;
   detecting whether sensitive information is included, with respect to modified file in the file inspection result information, wherein the detecting whether the sensitive information is included comprises generating the number of detections per pattern related to the sensitive information by extracting of file content, a regular expression and matching of a key word with respect to the file in which the field of whether file writing is changed is True from the file inspection result information; and
   modifying the file inspection result information by reflecting sensitive detection information according to the detection of the sensitive information, wherein the modifying the file inspection result information by reflecting the sensitive detection information comprises modifying, when the number of detections per pattern is generated, the file path field to be the generated number of detections per pattern in the file inspection result information, and modifying the field of whether file writing is changed, to be False.

2. The method of claim 1, wherein the file path field is a key field, which identifies a file of the file system, and refers to a file path of the sensitive information,
   wherein the field of whether file writing is changed refers to whether a file content change, a file size change, or change of a final file modification date occurs, and
   wherein the field for the number of detections per pattern refers to a matched number detected per pattern of the sensitive information from the file of the file system.

3. The method of claim 1, wherein the monitoring of the file change event comprises monitoring the file change event using a file system change notification application program interface (API), a file system change journal, a kernel event, and a kernel file system driver.

4. The method of claim 1, wherein the type of the file change event is any one of a file writing event, a file deletion event, a file movement event, and a directory movement event.

5. The method of claim 4, wherein the modifying of the file inspection result information comprises one of:
   modifying the file inspection result information, when the file writing event occurs, to add a file path of the file writing event to the file path field, and modifying the field of whether file writing is changed, to be True;
   modifying the file inspection result information, when the file deletion event occurs, to delete a file path corresponding to the file deletion event from the file path field;
   modifying the file inspection result information, when the file movement event occurs, a current file path of the file path field to be a new file path of the file movement event; and
   modifying the file inspection result information, when the directory movement event occurs, a current directory path of the file path field to be a new directory path of the directory movement.

6. The method of claim 1, further comprising, after modifying the file inspection result information, transmitting the sensitive detection information reflected in the file inspection result information to a management server.

7. An apparatus for inspecting sensitive information stored in a file system, the apparatus comprising:
   a database configured to store file inspection result information including a file path field, a field of whether file writing is changed, a file size field, a final file modification date field, and a field of a number of detections per pattern, with respect to a file in the file system;
   an event monitoring detector configured to detect a file change event generated in the file system;

an information modification controller configured to detect a type of the file change event sensed according to the file change event and modify the file inspection result information with respect to the file system according to the type of the file change event; and a sensitive information detector configured to detect whether sensitive information is included, with respect to modified file in the file inspection result information, by generating the number of detections per pattern related to the sensitive information by extracting of file content, a regular expression and matching of a key word with respect to the file in which the field of whether file writing is changed is True from the file inspection result information, wherein the information modification controller is configured to modify the file inspection result information by reflecting sensitive detection information according to the detecting of the sensitive information, by modifying, when the number of detections per pattern is generated, the file path field to be the generated number of detections per pattern in the file inspection result information, and modifying the field of whether file writing is changed, to be False.

8. The apparatus of claim 7, wherein the event monitoring detector is configured to detect the file change event using a file system change notification API, a file system change journal, a kernel event, and a kernel file system driver.

9. The apparatus of claim 7, wherein the event monitoring detector is configured to detect any one of a file writing event, a file deletion event, a file movement event, and a directory movement event, as the type of the file change event.

10. The apparatus of claim 9, wherein the information modification controller is configured to modify the file inspection result information by one of:
adding, when the file writing event occurs, a file path of the file writing event to the file path field, and modifying the field of whether file writing is changed, to be True;
deleting, when the file deletion event occurs, a file path corresponding to the file deletion event from the file path field;
modifying, when the file movement event occurs, a current file path of the file path field to be a new file path of the file movement event; and
modifying, when the directory movement event occurs, a current directory path of the file path field to be a new directory path of the directory movement.

11. The apparatus of claim 7, further comprising an information transmitter configured to transmit the sensitive detection information reflected in the file inspection result information to a management server.

* * * * *